(12) United States Patent
Donahue

(10) Patent No.: US 7,243,485 B2
(45) Date of Patent: Jul. 17, 2007

(54) VARIABLE STRETCH HORSE BLANKET

(76) Inventor: Alicia A. Donahue, 60 Sanderson Rd., Littleton, MA (US) 01460

( * ) Notice: Subject to any disclaimer, the term of this patent is extended or adjusted under 35 U.S.C. 154(b) by 16 days.

(21) Appl. No.: 10/928,086

(22) Filed: Aug. 27, 2004

(65) Prior Publication Data

US 2006/0042199 A1 Mar. 2, 2006

(51) Int. Cl.
 *B68C 5/00* (2006.01)
 *A01K 13/00* (2006.01)
(52) U.S. Cl. .................... 54/79.4; 54/79.2; 119/850
(58) Field of Classification Search ........... 119/850; 54/79.1, 79.2, 79.3, 79.4
 See application file for complete search history.

(56) References Cited

U.S. PATENT DOCUMENTS

| 502,508 | A | * | 8/1893 | Cleveland | 54/79.2 |
| 805,925 | A | * | 11/1905 | Meyers | 54/79.2 |
| 938,787 | A | * | 11/1909 | Pierce | 54/79.2 |
| 939,662 | A | * | 11/1909 | Burwell | 54/79.2 |
| 1,558,117 | A | * | 10/1925 | Rasch | 54/79.2 |
| 1,609,577 | A | * | 12/1926 | Schroedter | 54/79.2 |
| 4,671,049 | A | | 6/1987 | Benckhuijsen | |
| 5,271,211 | A | * | 12/1993 | Newman | 54/79.2 |
| 5,361,563 | A | | 11/1994 | Llamas | |
| 5,839,395 | A | | 11/1998 | Kelley et al. | |
| 6,003,290 | A | | 12/1999 | Hsi-Chang | |
| 6,009,693 | A | | 1/2000 | Hsi-Chang | |
| 6,234,117 | B1 | * | 5/2001 | Spatt | 119/850 |
| 6,318,054 | B1 | | 11/2001 | Gatto | |
| 6,467,244 | B1 | | 10/2002 | Kelley et al. | |
| 6,539,898 | B2 | * | 4/2003 | Gatto | 119/850 |
| 6,877,300 | B1 | * | 4/2005 | Hathcock | 54/79.2 |

2002/0043054 A1 4/2002 Gatto

FOREIGN PATENT DOCUMENTS

| EP | 0 595 423 A1 | 10/1993 |
| GB | 2223390 A | * 4/1990 |
| WO | WO 03/067968 A1 | 8/2003 |

OTHER PUBLICATIONS http://www.edirectory.co.uk/pf/static/880/ca10745.html Sport-Equestrian-Horse Rugs.

(Continued)

*Primary Examiner*—Son T. Nguyen
(74) *Attorney, Agent, or Firm*—Armand J. Rossetti

(57) ABSTRACT

A variable stretch horse blanket 13, shown in FIG. 3, of the type comprising either a single layer body of specialized, breathable and stretchable fabric 10, 11, or its alternative comprising a single layer body comprised of a plurality of permanently attached specially sized, paired, and positioned sections of specialized, breathable and stretchable fabric 76 through 106, as depicted in FIG. 8, with neck fastening means 24, 26, belly strap fastening means 54, 55, leg fastening assemblies 51, 53 and a supple reinforced portion 22.

The specialized, breathable and stretchable fabric 10,11 or its alternative 76 through 106 can be manufactured to permit either a dominant two-way stretch as depicted by one of twelve representative vector arrows 25, or variable dominant stretching in a plurality of directions as depicted by one of a multiplicity of vector arrows 108 shown in FIG. 8.

12 Claims, 6 Drawing Sheets

OTHER PUBLICATIONS http://www.thermatex.co.uk/welcome.php (Welcome to Thermatex.co.uk).
http://www.globalranch.com/articles/PrintArticle.asp?AID=199 Susan Holtzman: Horse Blankets for the English Discipline Horse; Choosing the Right Horse Blanket for Your Needs.
http://www.horsesdacor.com/HorsesDacor/catalog/Blankets.shtml.
http://www.equisearch.com/care/winter/stablerug101997/.
http://www.horseworks.com/catalog/reference.asp.
http://www.tackinthebox.com/horsewares/coolers_and_antisweats/HC404.htm.
http://southcanal.com/horse/product.php?mode=show&cid=37&pid=72 (this is an advertisement for sale of the invention posted on Apr. 1, 2004 and removed on Jun. 17, 2004).

* cited by examiner

VARIABLE STRETCH HORSE BLANKET

CROSS-REFERENCE TO RELATED APPLICATIONS

NOT APPLICABLE

FEDERALLY SPONSORED RESEARCH

NOT APPLICABLE

SEQUENCE LISTING OR PROGRAM

NOT APPLICABLE

BACKGROUND OF THE INVENTION—FIELD OF THE INVENTION

This invention relates to primary horse blankets, specifically to such horse blankets that stretch to conform to the horse's movement, that simultaneously provide activity related variable fit, reduced chaffing, reduced hair loss, wicking and drying capability, and increased positional stability.

BACKGROUND OF THE INVENTION

There is a present need for a variable stretch horse blanket that combines several desirable qualities, including moisture control, ventilation, and anti-chaffing. In addition, there should be no requirement for overly expensive, specialized design or manufacture to ensure that the blanket maintains its optimal position on the horse while the horse moves about during exercise or daily activity. A need particularly exists for a single horse blanket ("Blanket") that is lightweight, easy to care for, fast drying, resistant to wear, dimensionally stable during long-term use, conventionally designed, and low cost. The need also exists for a single blanket that can constantly adapt to the horse's movement and maintain a close, comfortable fit, prevent chaffing, reduce hair loss, largely as a result of the blanket remaining in optimal position on the horse while the horse moves about.

Numerous blankets are described in prior art. Blankets vary in shape, size, layering, and thickness. In addition, many variables affect the choice and use of a blanket. Comfort, durability, stability, and ease of use are universal concerns in choosing to use one particular blanket rather than another. For example, blankets that fit too tightly can produce discomfort, if not permanent injury, in sensitive anatomical areas of the horse such as the withers. A tight fit about the shoulders can cause the horse to lose hair and sustain painful injuries as a result of excess friction due to movement of the blanket while it is in use.

Blankets that cover the tail, or that rely upon fastening in the tail area with tail flaps to maintain optimal position, can interfere with the horse's ability to pass manure. In other instances, if the blanket is not well adapted to the horse, surcingles may have to be adjusted too tightly to keep the blanket in place, and tight surcingles usually cause discomfort. Yet another important consideration is the use of leg straps to further stabilize and secure the blanket. The use of inflexible leg straps to secure the blanket to the horse can restrict range of movement and cause friction burns that might result in infection that would necessitate a period of convalescence.

Several different blankets have been described that provide one or more, but not all, of the desirable qualities described herein above. Several examples follow:

U.S. Pat. No. 4,671,049 to Benckhuijsen proposes a blanket with two mutually moveable layers of knit fabric enclosing a middle air breathable synthetic foam layer that provides better heat protection. However, use of a single layer of specialized stretchable fabric to accomplish the same result would be more economical and easier to manufacture.

U.S. Pat. No. 5,361,563 to Llamas proposes a rather extensive one-piece blanket with a hood that has wicking capabilities. However, the Llamas invention suggests the need for several different blanket configurations and material compositions that conform to specialized use of the blanket, or to compensate for certain weather conditions. The Llamas invention suggests the use of specialized material such as nylon spandex, in limited circumstances, to minimize movement between the horse and blanket. However, nylon spandex, alone, does not provide optimum wicking properties.

Inventors have provided novel approaches to promote ventilation to the blanket-covered portion of the horse's body. One such novel approach is found in U.S. Pat. No. 6,003,290 to Hsi-Chang that proposes the use of a plurality of raised, grommeted, netted eyelets. The Hsi-Chang invention proposes using a flap attached at the top of each eyelet to prevent debris from infiltrating the blanket. The eyelets are raised to prevent water from passing through the eyelet and depositing under the blanket. While the flap-covered eyelets may allow ventilation and prevent the deposit of water and debris under the blanket to some degree, the use of raised eyelets with flaps is not the most efficient ventilation configuration. Further, a blanket containing flap-covered eyelets would not be lightweight, and the eyelets would tend to make the blanket more rigid, necessitating a more exact fit and more attention to mode of attachment to the horse. The Hsi-Chang invention does not address blanket fit, wicking properties, or anti-chaffing properties.

A further desirable quality in blanket design is prevention of blanket misalignment resulting from a horse's movements. U.S. Pat. No. 6,467,244 to Kelley, et al. ("Kelley") proposes the use of a specific blanket designed with overlapping front (chest) closure flaps to alleviate misalignment and binding about the horse's neck that might occur when the horse raises or lowers its head. Although the Kelley design addresses a specific problem with blanket misalignment during movement of the horse's head and neck, the Kelley blanket does not combine additional desirable qualities in its design or composition.

European patent application EP 0 595 423 A1 (Petiet, filed 26.10.03) proposes the use of flexible materials such as wool, jute or plastic to make blankets. The proposed use of such flexible materials to promote a more comfortable fit and prevent misalignment is logical. However, concerns with complex blanket design, material deformation, material durability, and less efficient wicking properties restrict or limit the efficient use of such materials.

BACKGROUND OF THE INVENTION—OBJECTS AND ADVANTAGES

Several objects and advantages of the current invention are:
(a) to provide a variable stretch blanket that is manufactured from single layer durable material, having a multiplicity of desirable properties, that is relatively inexpensive and available;
(b) to provide a blanket that is simple, and compact in design that can withstand multiple washing cycles, dry rapidly, and maintain its physical properties without becoming subject to rapid and excessive wear, deformation, or discoloring;

(c) to provide a blanket having superior wicking capabilities;

(d) to provide a blanket having optimal adaptive fit attributable to simple design and to properties within the fabric that permits a single blanket area, individually, or an infinite multiplicity of areas, simultaneously, to stretch in any direction, as is necessary to maintain the blanket in an optimal position, when the horse moves about;

(e) to provide a blanket specifically designed to promote a close fit and that is manufactured from fabric that is capable of sizably adapting to various changes in a horse's body condition, such as muscular development or weight change that would ordinarily affect blanket fit from year to year;

(f) to provide a blanket that when placed upon and attached to a horse will substantially and effortlessly adapt to the horse's body shape, and that will stay in place without necessitating an overly tightened belly strap;

(g) to provide a blanket having minimum slippage when in use, and one that is made from high technology fabrics that reduce chaffing and loss of hair;

(h) to provide a blanket with a single layer of specialized fabric material that combines the greatest number of desirable properties, yet a blanket that requires substantially shorter cycles between cleaning/drying and re-use;

(i) to provide a blanket that is compact, lightweight, versatile, inexpensive, easy to manufacture, and one that is easy to use;

(j) to provide a blanket that can be customized as desired, to custom fit any particular horse by varying the direction of the fabric fibers and the intensity of the stretch capability of the blanket by specifically orienting the warp and/or weft of the weave to coincide with the horse's anatomy and muscle fiber orientation, either within the fabric itself, through the use of variable axial warp and weft knitting techniques, or by orienting and connecting together like or different, paired specialized, breathable and stretchable fabric segments made from a variety of different conforming materials.

SUMMARY

In accordance with the present invention, a blanket comprises a single layer body of specialized, breathable and stretchable fabric, consisting of bilaterally, symmetrically paired separate sections of specialized, breathable stretchable fabric secured together, defining a top surface and a bottom surface.

The invention further comprises a continuous reinforced border manufactured with a non-stretch or stretch synthetic fabric.

The invention has an attached reinforced withers portion made from a softer and more plush fabric material.

The stretch properties of the single layer body when combined with at least one neck fastening means, one belly fastening means and at least two leg fastening means attached to the single layer body of specialized, breathable and stretchable fabric in a specific manner, secure the blanket to the horse and substantially prevent chaffing, loss of hair, and blanket displacement during use.

The invention further comprises a non-stretch fabric anchoring strip fixedly secured to the top surface of the blanket, being symmetrically superimposed upon the area where at least two separate sections of specialized, breathable and stretchable fabric are connected together.

When in use, the orientation of the stretch fibers of the specialized, breathable and stretchable fabric permit substantially dominant, as well as, secondary fabric stretching characteristics in at least two directions for a given embodiment, or at most a plurality of directions, determined by the direction of the horse's underlying muscle fiber bundles, when making a customized embodiment. Additional embodiments of the invention can result from use of a variety of available similar fabric types that will permit variability of fabric stretch with virtual full recovery of fabric dimension, as blanket covered areas of the horse's musculature and the horse's musculature itself simultaneously change length. Varying the orientation of the fabric in whole or in part, and using certain fabric with particular stretching characteristics, permits a customized embodiment of the invention to accentuate certain optimal fabric stretch properties that are beneficial, causing a customized embodiment of the blanket to adapt nearly exactly to a particular horse's movements and habits. Customization permits the manufacture of a plurality of closely related preferred embodiments of the invention that are substantially similar enough to be represented as first and second preferred embodiments.

A first preferred embodiment comprises in part a non-stretch fabric anchoring strip that is positioned on the top surface and that rests upon the horse's spinal area when the blanket is in use. The anchoring strip of the preferred embodiment spans the length of the blanket from an area at the base of the horse's withers to an area near its tail.

Said first preferred embodiment comprises in part an additional layer of protective fabric composed of anti-chafing material consisting of waterproof, breathable multiple ply nylon fabric fixedly secured to the bottom surface of the blanket that covers the horse's shoulders/withers.

The entire specification will describe various additional uses and advantages of the invention. However, the specification and drawings disclose only some of the various ways in which one may practice the invention.

DRAWINGS—FIGURES

Figure 4:
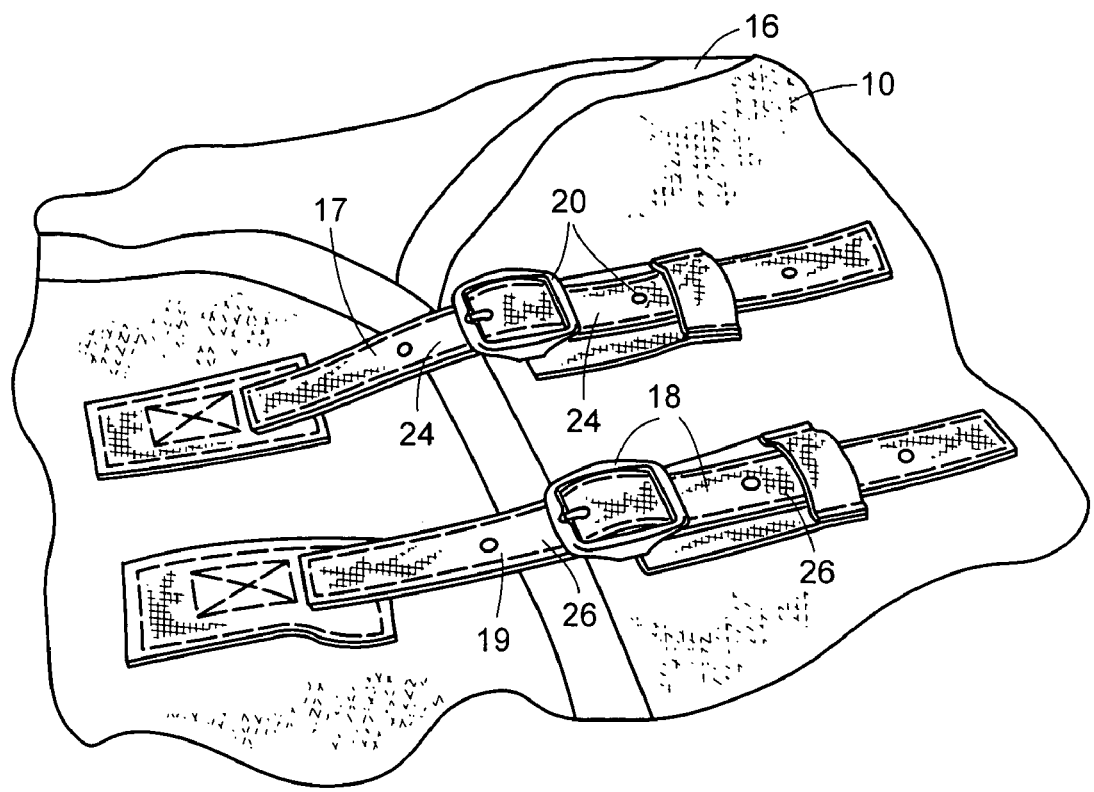

FIG. 4 depicts a first neck fastening means 24 comprising a first neck strap 17 secured together with a first belt buckle assembly 20 and a second neck fastening means 26 comprising a second neck strap 19 secured together with a second belt buckle assembly 18.

Figure 5:
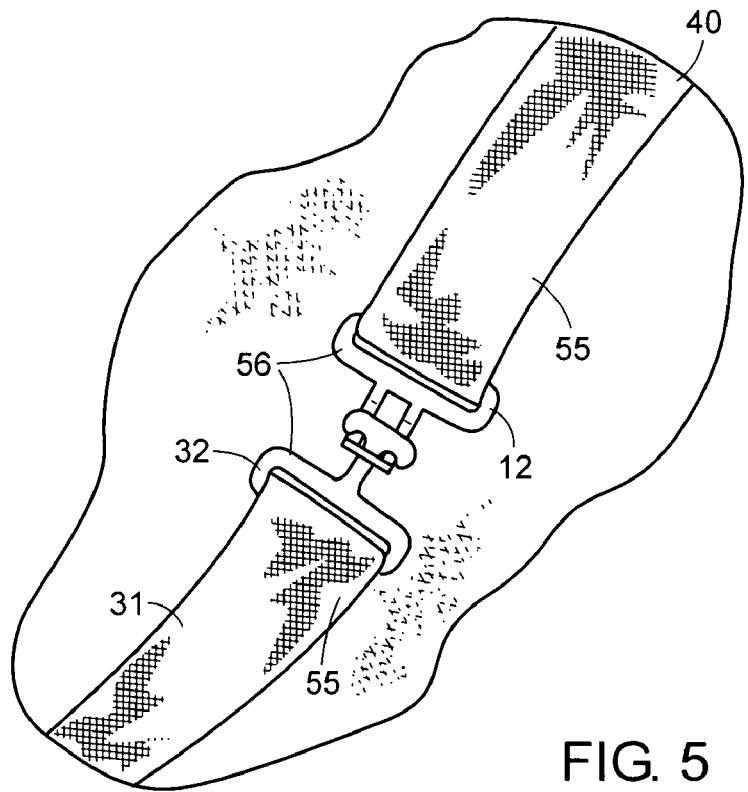

FIG. 5 depicts a first belly fastening means 55 comprising a coupled quick disconnect belt clasp 56, having a female portion 12 and a male portion 32. The coupled quick disconnect belt clasp 56 connects the female portion of the first belly fastening means 40 to the male adjustable portion of the first belly fastening means 23.

Figure 6:
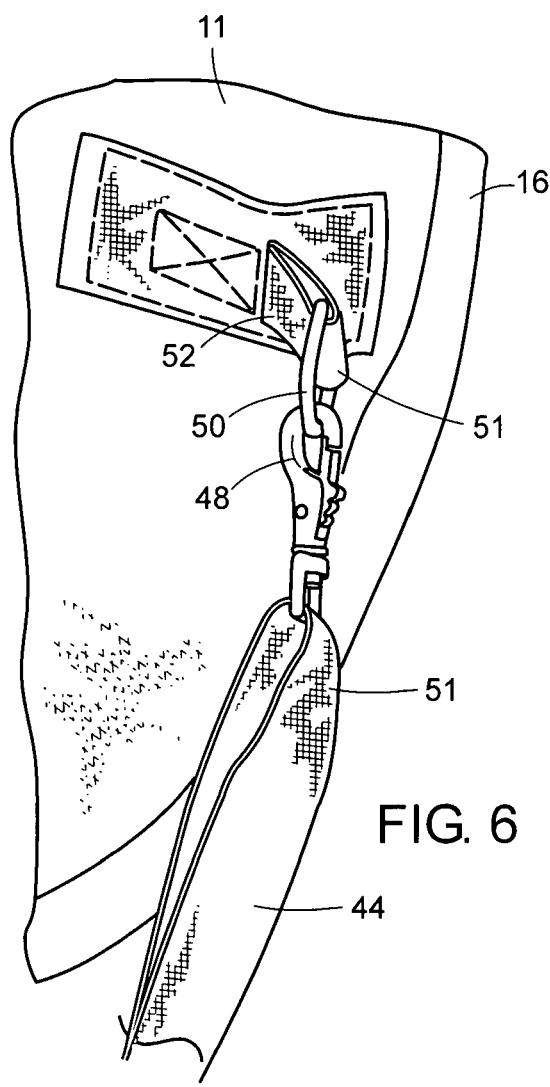

FIG. 6 depicts a first leg fastening assembly 51 having a first swivel dog clip 48 connected to a first clip ring 50. The first clip ring 50 is loosely but securely fixed to a female portion of the first leg fastening means 52. The first swivel dog clip 48 is loosely but securely fixed to a male adjustable portion of first leg fastening means 44.

Figure 7:
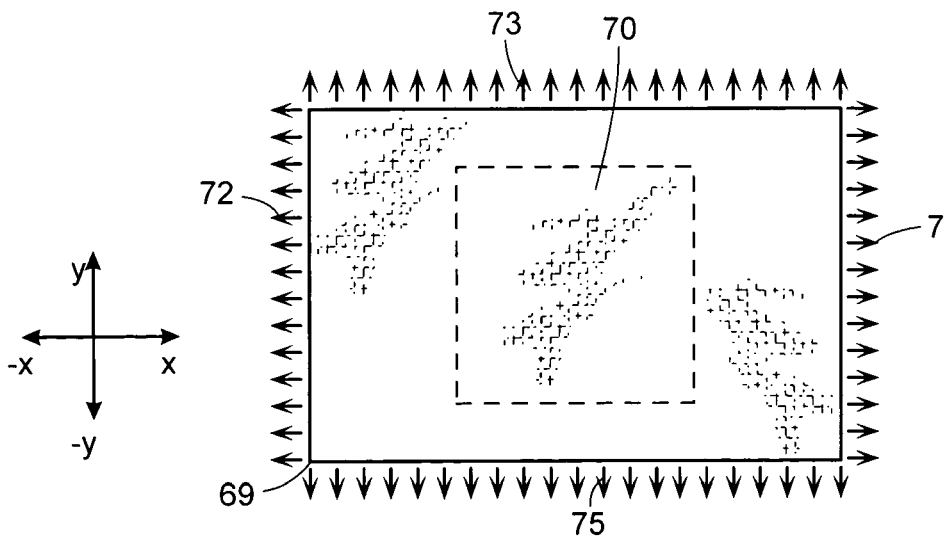

FIG. 7 depicts a symmetrically expanded cutout square section of specialized, breathable and stretchable fabric ("expanded cutout") 69. The expanded cutout of 69 is shown in an original size non-stretched state 70. FIG. 7 also depicts a vector force applied in the "−x" direction 72, a vector force applied in the "y" direction 73, a vector force applied in the "x" direction 74 and a vector force applied in the "-y" direction 75.

Figure 8:
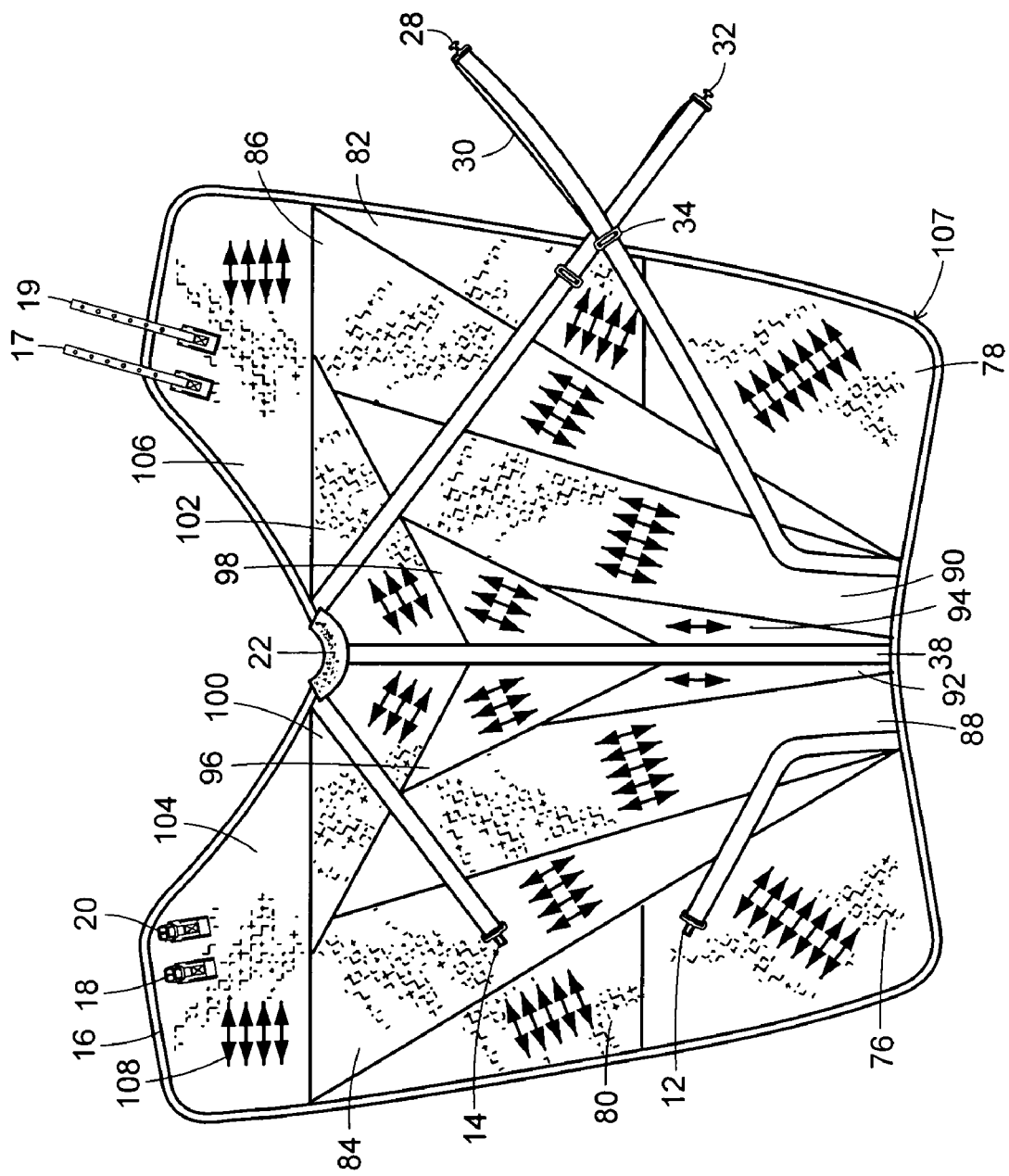

FIG. 8 depicts a plan view of an alternate embodiment of the horse blanket 107 depicted in FIG. 1 where the specialized breathable and stretchable fabric has been replaced by a single layer body comprised of a plurality of attached specially sized, paired, and positioned sections of specialized breathable and stretchable fabric, 76, 78, 80, 82, 84, 86, 88, 90, 92, 94, 96, 98, 100, 102, 104, and 106 (collectively hereinafter referred to as "76 through 106").

Figure 1:
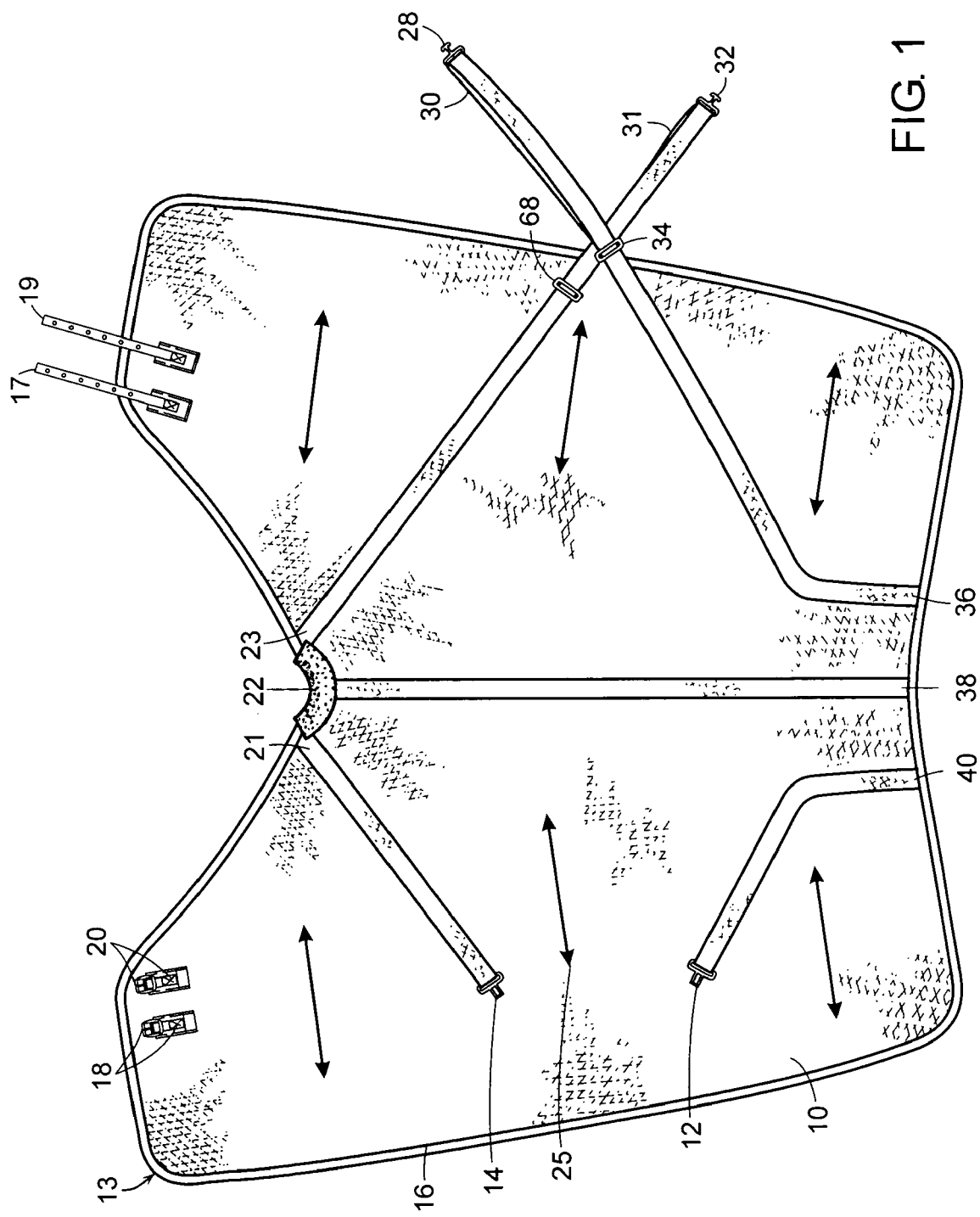
FIG. 1 is a plan view of a top surface of a variable stretch horse blanket 13 according to the invention.
Figure 2:
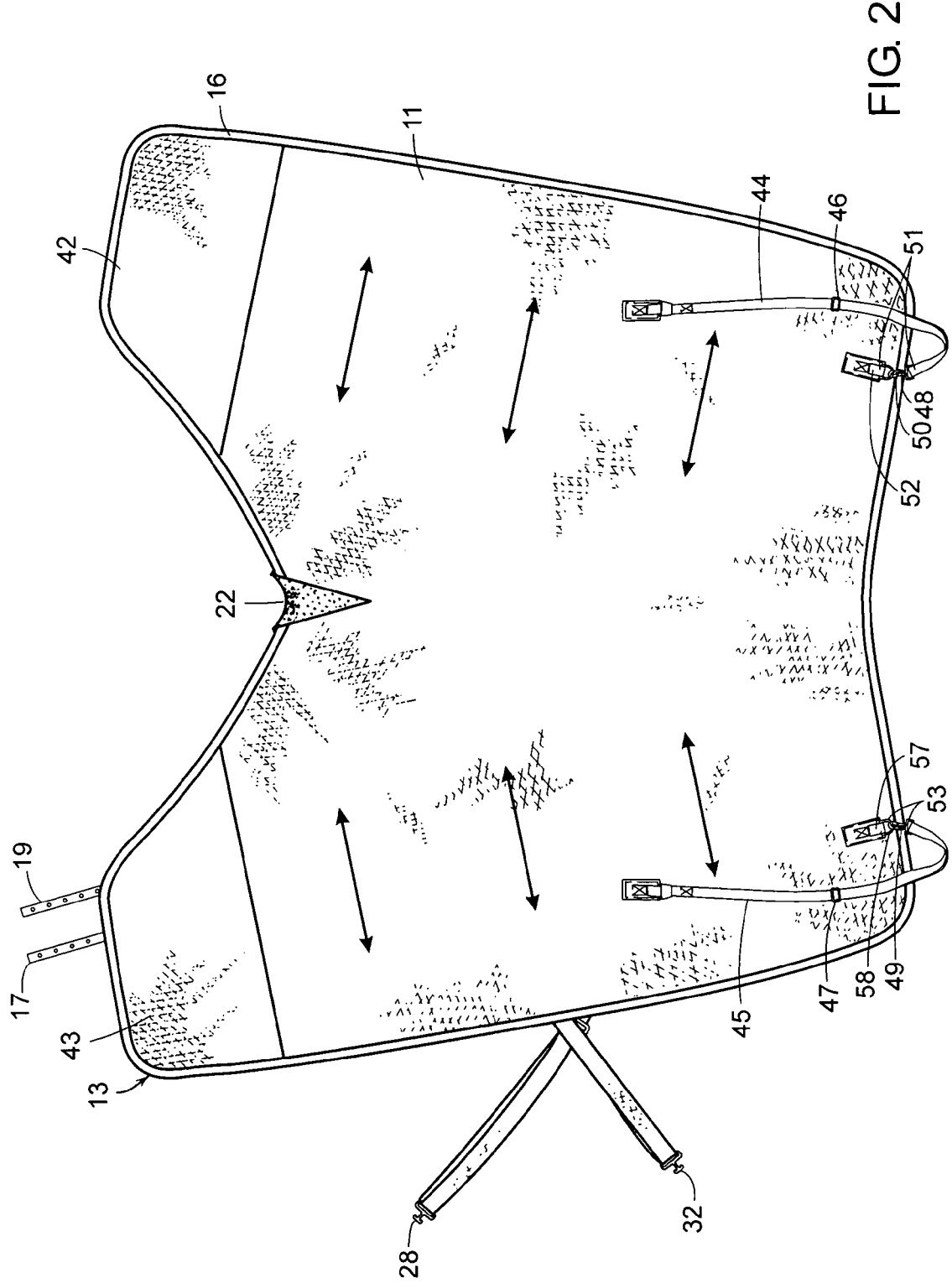
FIG. 2 is a plan view of a bottom surface of the variable stretch horse blanket 13 according to the invention.

DRAWINGS—REFERENCE NUMERALS 10 top surface of specialized, breathable and stretchable fabric
11 bottom surface of specialized, breathable and stretchable fabric
12 female portion of first quick disconnect belt clasp
13 variable stretch horse blanket
14 female portion of second quick disconnect belt clasp
16 continuous reinforced border
17 first neck strap
18 second belt buckle assembly
19 second neck strap
20 first belt buckle assembly
21 female connected portion of second belly fastening means
22 supple fabric reinforced portion
23 male adjustable portion of first belly fastening means
24 first neck fastening means
25 one of twelve representative vector arrows depicted in FIGS. 1-2
26 second neck fastening means
28 male portion of second quick disconnect belt clasp
30 adjustable portion of second belly fastening means
31 adjustable portion of first belly fastening means
32 male portion of first quick disconnect belt clasp
34 adjustable slide bar of second belly fastening means
36 male adjustable portion of second belly fastening means
38 non-stretch fabric anchoring strip
40 female connected portion of first belly fastening means
42 first additional layer of protective fabric
43 second additional layer of protective fabric
44 male adjustable portion of first leg fastening means
45 male adjustable portion of second leg fastening means
46 adjustable slide bar of first leg fastening means
47 adjustable slide bar of second leg fastening means
48 first swivel dog clip
49 second swivel dog clip
50 first clip ring
51 first leg fastening assembly
52 female portion of first leg fastening means
53 second leg fastening assembly
54 second belly fastening means
55 first belly fastening means
56 coupled quick disconnect belt clasp
57 female portion of second leg fastening means
58 second clip ring
68 adjustable slide bar of first belly fastening means
69 a symmetrically expanded cutout square section of specialized, breathable and stretchable fabric
70 original size non-stretched state
72 a vector force applied in the "-x" direction
73 a vector force applied in the "y" direction
74 a vector force applied in the "x" direction
75 a vector force applied in the "-y" direction
76 through 106 a single layer body comprised of a plurality of permanently attached specially sized, paired, and positioned sections of specialized, breathable and stretchable fabric
107 variable stretch horse blanket of second preferred embodiment
108 one of a multiplicity of vector arrows shown in FIG. 8

DETAILED DESCRIPTION—FIGS. 1-6—FIRST PREFERRED EMBODIMENT

A first preferred embodiment of the inventive variable stretch horse blanket 13 (hereinafter referred to as the "horse blanket") is depicted in FIGS. 1-6. The horse blanket 13 refers to a single garment wherein a permanent attachment means serves to attach all of the various portions of the garment together as a continuous piece of material, having fastening means, that can be placed on a horse.

The use herein of the terms "permanent attachment means" or "permanently attached" refer to a means (e.g., chemical bonding, fabric welding, mechanical sewing or like means) that permits pieces of material to be joined together and not come apart unless the material is physically cut, ripped or torn away, or the permanent attachment means otherwise becomes physically or chemically compromised and the permanent attachment means fails to perform its function.

Portions of the horse blanket 13 are depicted in FIGS. 1 through 6.

FIG. 1 shows a top surface of specialized, breathable and stretchable fabric 10 of the horse blanket 13 having a continuous reinforced border 16 composed of synthetic fabric that is non-stretch and selected from a group consisting of commercially available nylon webbing fabric, polyester webbing fabric, and polypropylene webbing fabric. A non-stretch fabric anchoring strip 38 having two ends, manufactured from the same or similar material as the continuous reinforced border 16, is permanently attached to a top surface of specialized, breathable and stretchable fabric 10. The non-stretch fabric anchoring strip 38 is also attached at each of its two ends to the continuous reinforced border 16, and thereby bisects the horse blanket.

FIG. 1 also depicts several permanently attached portions of the horse blanket 13 including: a supple fabric reinforced portion 22; a female connected portion of second belly fastening means 21 having an attached female portion of second quick disconnect belt clasp 14; a male adjustable portion of first belly fastening means 23 having an adjustable slide bar of first belly fastening means 68, and an adjustable portion of first belly fastening means 31, with an attached male portion of first quick disconnect belt clasp 32; a first neck strap 17; a second neck strap 19; a male adjustable portion of second belly fastening means 36 having an adjustable slide bar of second belly fastening means 34, and an adjustable portion of second belly fastening means 30, with an attached male portion of second quick disconnect belt clasp 28; a female connected portion of first belly fastening means 40 having an attached female portion of first quick disconnect belt clasp 12; an attached first belt buckle assembly 20; and an attached second belt buckle assembly 18.

In addition to the several permanently attached portions of the horse blanket 13, depicted in FIG. 1, several additional permanently attached portions are depicted in FIG. 2 including: a first additional layer of protective fabric 42; a second additional layer of protective fabric 43; a male adjustable portion of first leg fastening means 44, having an attached adjustable slide bar of first leg fastening means 46; a first leg fastening assembly 51, comprising a first ring clip 50 attached to a female portion of first leg fastening means 52 and releasably connected with a first swivel dog clip 48 attached to the male adjustable portion of first leg fastening means 44, with the male adjustable portion of first leg fastening means 44 and the female portion of first leg fastening means 52 being permanently attached and inseparable portions of the horse blanket 13; a male adjustable portion of second leg fastening means 45, having an attached adjustable slide bar of second leg fastening means 47; a second leg fastening assembly 53, comprising a second clip ring 58 attached to a female portion of second leg fastening means 57 and releasably connected with a second swivel dog clip 49 attached to the male adjustable portion of second leg fastening means 45, with the male adjustable portion of second leg fastening means 45 and the female portion of second leg fastening means 57 being permanently attached and inseparable portions of the horse blanket 13.

Figure 3:
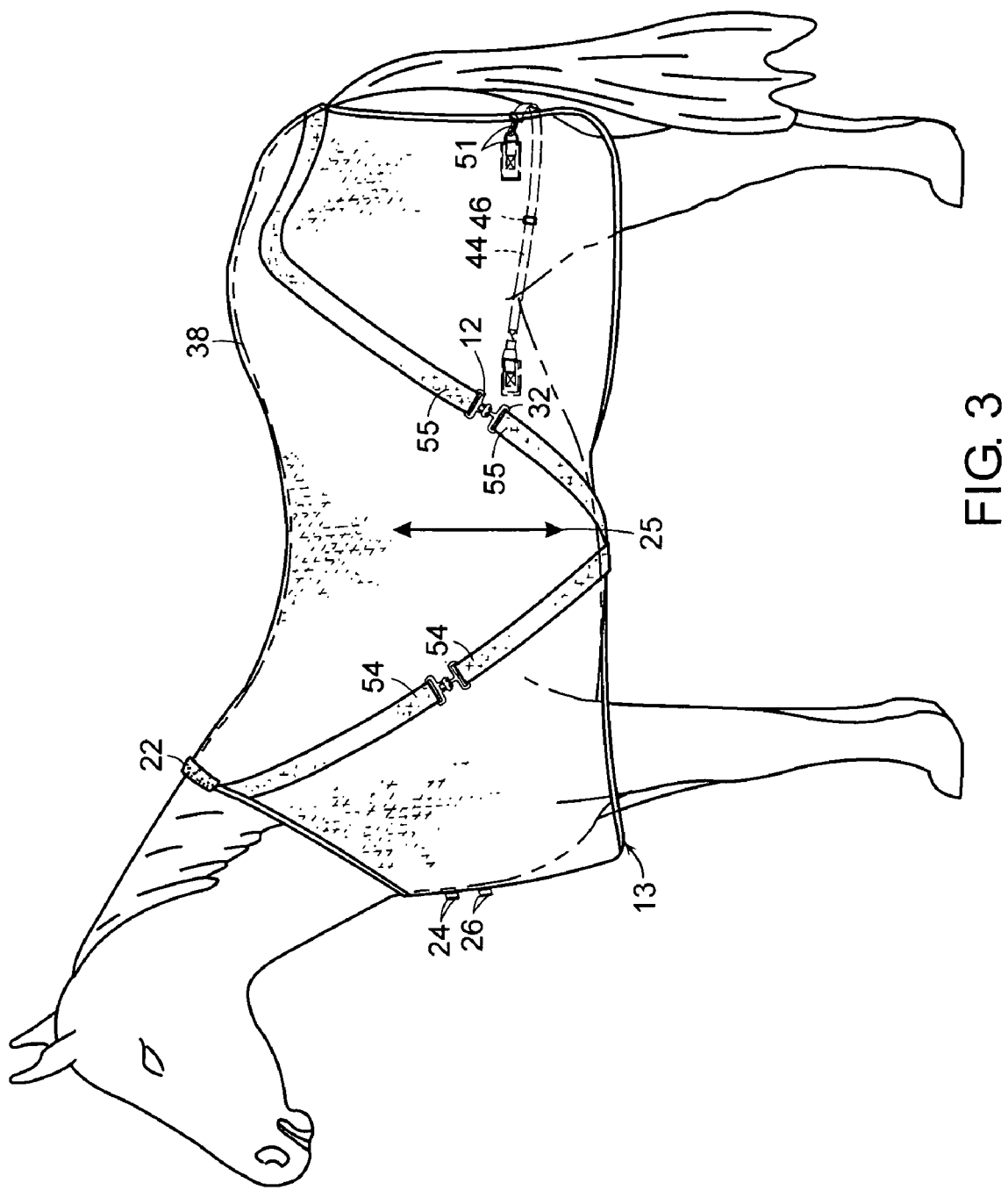
FIG. 3 is an elevational side view of the variable stretch horse blanket 13 according to the invention, positioned on a horse.

FIG. 3 depicts the horse blanket 13 positioned on a horse. The depiction of FIG. 3 shows the supple fabric reinforced portion 22 resting on the neck of the horse, and the non-stretch fabric anchoring strip 38 resting on the midline back of the horse. The first belly fastening means 55 is further depicted in part in FIG. 5 as comprising: the female connected portion of first belly fastening means 40, having the female portion of first quick disconnect belt clasp 12 attached thereto; and the adjustable portion of first belly fastening means 31 having the male portion of first quick disconnect belt clasp 32 attached thereto. The female portion of the first quick disconnect belt clasp 12 is shown in FIG. 5 as being releasably connected together with the male portion of the first quick disconnect belt clasp 32. The first belly fastening means 55 is also depicted as such in FIG. 3, together with the depiction of a second belly fastening means 54.

The first leg fastening assembly 51 is depicted in FIG. 3 as being secured around one of the horse's two hind legs. FIG. 6 further depicts the first leg fastening assembly 51 having the female portion of the first leg fastening means 52 permanently attached to the bottom surface 11 of the specialized, breathable and stretchable fabric. The first clip ring 50 is fixedly but movably attached to the female portion of the first leg fastening means 52. The first swivel dog clip 48, which is fixedly but movably attached to the male adjustable portion of first leg fastening means 44, is releasably connected to the first clip ring 50, as would be the case when the first leg fastening assembly means 44 is suitably positioned and secured around one of the horse's hind legs.

Generally FIG. 3, and more particularly, FIG. 6 further depict the horse blanket 13 as having the first neck fastening means 24 and the second neck fastening means 26. FIG. 6 depicts the first neck fastening means 24 as comprising the first neck strap 17 permanently attached to the top surface of specialized, breathable and stretchable fabric 10 and releasably connected with the first belt buckle assembly 20. The first belt buckle assembly 20 is permanently attached to the top surface of specialized, breathable and stretchable fabric 10. FIG. 6 further depicts the second neck fastening means 26 as comprising the second neck strap 19 permanently attached to the top surface of specialized, breathable and stretchable fabric 10 and releasably connected with the second belt buckle assembly 18. The second belt buckle assembly 18 is permanently attached to the top surface of specialized, breathable and stretchable fabric 10.

When either the horse blanket 13 of the first preferred embodiment, or a variable stretch horse blanket of second preferred embodiment 107 (as depicted in FIG. 8) are positioned on a horse, the first neck fastening means 24, the second neck fastening means 26, the first belly fastening means 55, the second belly fastening means 54, the first leg fastening assembly 51 and the second leg fastening assembly 53, when all are releasably connected as described above, provide an additional means of stabilizing each respective inventive horse blanket while in use.

The specialized, breathable and stretchable fabric 10,11 (a portion of the specialized, breathable and stretchable fabric is also depicted as 70 in FIG. 7) of the horse blanket 13 is comprised in part of an abundance of two-way stretch fibers woven to stretch as depicted by one of twelve representative vector arrows 25 depicted in FIGS. 1-2 and shown, isolated, in FIG. 3. As will be explained below, the manufacture of the specialized, breathable and stretchable fabric 10,11 is not limited to a singular two-way stretch pattern. Stretchable fibers can follow any number of generalized and/or unique warp/weft patterns, known to those schooled in the art of weaving, to achieve best fit for any particular horse having unique muscular characteristics, or of any typical horse belonging to a breed of horses with unique muscular characteristics. Therefore, the preferred embodiments of the inventive horse blanket are not limited in manufacture to the use any particular stretch configuration of specialized, breathable and stretchable fabric 10,11.

As depicted in FIG. 7, the two-way stretch fibers of the preferred embodiments of the inventive horse blanket actively expand subsequent to a vector force applied in the "x" direction 74 and a vector force applied in the "–x" direction 72, and the two-way stretch fibers resume their original length upon release of all vector forces. The specialized, breathable and stretchable fabric 10, 11 of the preferred embodiments of the inventive horse blanket has a weight of 220 g/m$^2$ and is manufactured using a CoolMax®. It is well known that CoolMax® is a readily available DuPont-certified, four-channel, moisture transport fiber that provides substantial wicking capability. However, the variable stretch horse blanket that is the invention can be manufactured in a range of suitable weights, and any number of combinations of suitable stretch and other fibers that will provide the horse blanket 13, and a variable stretch horse blanket of second preferred embodiment 107, with unique and desired characteristics as described in this specification.

One of the twelve representative vector arrows 25 depicted in FIGS. 1 and 2, and further depicted as a single vector arrow in FIG. 3, shows a dominant stretch direction of the weave of the CoolMax® stretch fiber that makes up the specialized, breathable and stretchable fabric 10,11. The weaving of CoolMax® two-way stretch fibers in one axis direction as depicted by the vector forces 72 (in the "–x" direction), 74 (in the "x" direction) in FIG. 7 permits a secondary stretch characteristic to occur in a multitude of directions, with the most substantial secondary stretch occurring in the axis direction depicted by vectors 73 (in the "y" direction), 75 (in the "–y" direction). The major portion of the secondary stretch occurs along the "y" axis that is perpendicular to the "x" axis, which is the dominant stretch direction. It is obvious, however that the specialized, breathable and stretchable fabric 10,11 used to manufacture the preferred embodiments allows a multitude of uneven vector forces to be applied in any number of vector force combinations, and in any number of different directions, to adapt to a horse's muscular movements while the horse is in motion, thus providing a stable, variable close fit. Manufacture of the specialized, breathable and stretchable fabric 10,11 is not limited by using the particular type of Cool- Max® fiber described herein. A manufacturer can choose from a plurality of other types of variable stretch woven CoolMax® fibers. In addition, there are other materials that a manufacturer might use, depending on the particular application for a particular horse and desired result. For example, at the present time, one might choose to manufacture the specialized, breathable, and stretchable fabric 10,11 by weaving any combination of fibers in any warp-weft configuration possible, which fibers are selected from the group consisting of CoolMax®, Lycra® (DuPont), Technofine™ (a tri-channel polyester fiber manufactured by Asahi-Kasei Microsystems, Co., Tokyo, Japan), Twinair™ (a flat profile, twin hollow tube fiber that transports moisture along the outer grooves formed by the twin filament of each separate fiber manufactured by Asahi-Kasei Microsystems, Co., Tokyo, Japan), and Sunpaque™ (containing a high content of ceramic filaments that block out harmful UV rays and that reflects heat causing infrared rays, manufactured by Asahi-Kasei Microsystems, Co., Tokyo, Japan). However, other fiber choices for use in manufacturing specialized, breathable and stretchable fabric 10,11 might presently exist or might be available for such use in the future.

DETAILED DESCRIPTION—FIG. 8—SECOND PREFERRED EMBODIMENT

As previously mentioned, FIG. 8 depicts a variable stretch horse blanket of second preferred embodiment 107 (hereinafter referred to as "second preferred embodiment"). With the exception of the manner in which the specialized, breathable and stretchable fabric 76 through 106 of the second preferred embodiment 107 is sectioned, configured and permanently attached together to form a single unit, the second preferred embodiment 107 does not differ in manufacture from the inventive horse blanket of the first embodiment as described above.

FIG. 8 depicts a single layer body comprised of a plurality of specially sized, paired and positioned sections of specialized, breathable and stretchable fabric 76 through 106 (hereinafter "fabric sections") that are contiguously and permanently attached to each other as shown. For example, fabric section 104, which is permanently attached to fabric sections 80, 84 and 100 is paired in size and function and mirrored in position with fabric section 106, which is permanently attached to fabric sections 82, 86 and 102. As FIG. 8 further depicts, fabric sections 80 is paired in size and function and mirrored in position with fabric section 82; fabric section 84 is paired with fabric section 86 in the same manner; and fabric section 100 is paired with fabric section 102 in the same manner. Pairing as to size and function with mirrored positioning is also evident between fabric sections 88 and 90, 76 and 78, 96 and 98, and 92 and 94.

Each of the fabric sections depicted in FIG. 8 show sets of vector arrows, represented by one of a multiplicity of vector arrows 108, that are drawn to illustrate the direction in which the two-way stretch fibers contained in each fabric section are oriented. The particular orientation of the two-way stretch fibers of fabric sections 76 through 106 mirrors the anatomical orientation of a horse's muscle fibers, and are characteristic of different groups of paired muscles of the horse. Therefore, the object of such fabric section orientation is to allow the dominant stretch direction in each of the paired fabric sections 76 through 106 to mimic the dominant stretch direction inherent in the horse's muscles. In achieving similar dominant stretch between the fabric sections 76 through 106 and the horse's muscles that is inherent when the horse moves, the horse blanket will not noticeably limit the horse's movement, and the customized stretch orientation will increase further the positional stability of the second preferred embodiment.

The fabric section configuration of second preferred embodiment 107 lends itself to the manufacture of specific, customized variable stretch horse blankets as depicted by the second preferred embodiment 107. The paired fabric sections 76 through 106, can be sized differently, paired in function, and permanently attached to each other to accommodate the size and muscular characteristics of any particular horse. It should also be obvious to those skilled in the art of fabric manufacturing that a single woven piece of fabric, having specialized, variable warp/weft configurations can be manufactured that will have most if not all of the qualities exhibited by piecing together and permanently attaching the fabric sections 76 through 106, as depicted in FIG. 8.

In conclusion, various changes and modifications may be made to the preferred embodiments without departing from the spirit and scope of the invention. Thus, by way of example and not of limitation, instead of using CoolMax®, other hydrophobic fibers having large surface areas could be employed, preferably those with longitudinal channels included in their structure. In addition, instead of using knit panels, other panels formed of this type of fiber and having a relatively open weave may be employed. Accordingly, the present invention is not limited precisely to the materials and structures described in detail hereinabove and shown in the accompanying drawings, but solely to the scope of the following claims.

I claim:

1. A variable stretch horse blanket of the type consisting of:
    (a) a single layer body of specialized, breathable and stretchable fabric defining a top surface and a bottom surface;
    (b) a continuous reinforced border manufactured with synthetic fabric;
    (c) at least one neck fastening means coupled to said single layer body to secure said variable stretch horse blanket at the chest area and about a horse's neck;
    (d) at least one belly fastening means specially coupled to said single layer body of specialized, breathable and stretchable fabric to secure said variable stretch horse blanket at the belly of the horse;
    (e) at least two leg fastening means coupled to said single layer body of specialized, breathable and stretchable fabric to secure said variable stretch horse blanket to at least two opposing legs of the horse;
    (f) a non-stretch fabric anchoring strip holding the blanket to the horse's spinal area to facilitate the variable stretching of the blanket, the anchoring strip secured to said top surface, and positioned to rest upon the horse's spinal area ranging approximately from the horse's withers to its tail
    (g) a supple fabric reinforced withers portion integrated with said single layer body of specialized, breathable and stretchable fabric; and
    (h) an anti-chafing material integrated with said bottom surface that covers the horse's shoulders.

2. The variable stretch horse blanket of claim 1 wherein said specialized, breathable and stretchable fabric is composed of a multi-channel polyester fiber interwoven with segmented polyurethane fibers.

3. The variable stretch horse blanket of claim 2 wherein said breathable and stretchable fabric is composed entirely of between seventy-five percent to eighty-five percent four-channel polyester fibers that are interwoven with between fifteen percent and twenty-five percent segmented polyurethane fibers.

4. The variable stretch horse blanket of claim 2 wherein said specialized, breathable and stretchable fabric has a weight of at least 125 grams per square meter.

5. The variable stretch horse blanket of claim 1 wherein said continuous reinforced border is composed of said synthetic fabric that is stretchable and selected from the group consisting of stretch nylon, stretch polyester, and stretch Lycra.

6. The variable stretch horse blanket of claim 1 wherein said leg fastening means are composed of elastic nylon webbing material.

7. The variable stretch blanket of claim 1 wherein said leg fastening means and said belly fastening means are adjustable.

8. The variable stretch horse blanket of claim 1 wherein said single layer body of specialized, breathable and stretchable fabric defining a top surface and a bottom surface is composed of several permanently attached, paired bilaterally identical sections of specialized, breathable and stretchable fabric of various shapes, sizes and filament orientations, that are symmetrically paired.

9. The variable stretch horse blanket of claim 8 wherein said several paired bilaterally identical sections of specialized, breathable and stretchable fabric of various shapes, sizes correspond with and mimic the various shapes, sizes and fiber directions of any particular horse's skeletal muscle groups.

10. The variable stretch horse blanket of claim 9 wherein at least two, or at most all, of said several paired bilaterally identical sections of specialized, breathable and stretchable fabric of various shapes and sizes are composed of different types of specialized, breathable and stretchable fabric, selected from the group consisting of: (a) 100% polyester mesh made with four-channel, polyester fibers that are warp-knit in a tricot construction; (b) extruded polyester fibers with unusually shaped cross sections, having a moisture content as low as 0.5 percent; (c) high content ceramic filaments; (d) tri-channel, "W" shaped polyester fiber; and (e) flat profile, twin hollow tube fibers.

11. The variable stretch blanket of claim 9 wherein said several paired bilaterally identical sections of specialized, breathable and stretchable fabric of various shapes, sizes are continuously woven as warp/weft patterns.

12. The variable stretch blanket of claim 1 wherein said anti-chafing material is composed of waterproof, breathable multiple ply nylon fabric.

* * * * *